US009183297B1

(12) United States Patent
Baker et al.

(10) Patent No.: US 9,183,297 B1
(45) Date of Patent: Nov. 10, 2015

(54) METHOD AND APPARATUS FOR GENERATING LEXICAL SYNONYMS FOR QUERY TERMS

(75) Inventors: Steven Baker, San Francisco, CA (US); Maureen Heymans, San Francisco, CA (US); Evan M. Martin, San Francisco, CA (US); Dimitra Papachristou, Mountain View, CA (US); Trystan G. Upstill, Mountain View, CA (US); Ke Yang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1447 days.

(21) Appl. No.: 12/546,649

(22) Filed: Aug. 24, 2009

Related U.S. Application Data (63) Continuation of application No. 11/582,767, filed on Oct. 17, 2006, now abandoned.

(60) Provisional application No. 60/835,121, filed on Aug. 1, 2006.

(51) Int. Cl.
*G06F 17/30* (2006.01)
(52) U.S. Cl.
CPC .............................. *G06F 17/30864* (2013.01)

(58) Field of Classification Search
CPC .................. G06F 17/30864; G06F 17/30241; G06F 17/30637; G06F 17/30672
USPC ......... 707/707, 713, 716, 755, 759, 769, 802, 707/706
See application file for complete search history.

(56) References Cited

U.S. PATENT DOCUMENTS

| | | | |
|---|---|---|---|
| 7,155,427 B1 * | 12/2006 | Prothia et al. .................. | 707/694 |
| 2002/0103809 A1 * | 8/2002 | Starzl et al. ................... | 707/102 |
| 2002/0123995 A1 * | 9/2002 | Shibuya ........................... | 707/6 |
| 2007/0011154 A1 * | 1/2007 | Musgrove et al. ................ | 707/5 |

* cited by examiner

*Primary Examiner* — Apu Mofiz
*Assistant Examiner* — Fariborz Khoshnoodi
(74) *Attorney, Agent, or Firm* — Fish & Richardson P.C.

(57) ABSTRACT

One embodiment of the present invention provides a system that considers lexical synonyms for terms while processing a query. During operation, the system receives a query containing one or more terms. Next, the system identifies one or more lexical synonyms for the one or more terms. The system then generates an altered query using the one or more lexical synonyms and processes the altered query to produce search results.

18 Claims, 5 Drawing Sheets

| Test 410 | Score 420 | Base 430 | High 440 |
|---|---|---|---|
| frequently_alterable 450 | Ratio of pseudo-queries of a particular type that can be derived from both the original phrase and the synonym<br>= (i)/TDQ | 0.01 | 0.015 |
| frequently_much_in_common 460 | Fraction of user queries for which an altered query has at least three search results in common with the original query<br>= (iv)/(ii) | 0.6 | 0.85 |
| frequently_altered 470 | Fraction of user queries for which the original query is followed by the altered query within a user session<br>= (v)/TDQ | 0.0005 | 0.0015 |
| high_altering_ratio 480 | Fraction of user queries for which the original query is followed by the altered query within a user session divided by the fraction of user queries for which the altered query is followed by the original query within a user session<br>= (v)/(vi) | 1.0 | 3.0 |

FIG. 4

METHOD AND APPARATUS FOR GENERATING LEXICAL SYNONYMS FOR QUERY TERMS

CROSS REFERENCE TO RELATED APPLICATIONS

This is a continuation application of U.S. patent application Ser. No. 11/582,767, filed on Oct. 17, 2006, entitled "METHOD AND APPARATUS FOR GENERATING LEXICAL SYNONYMS FOR QUERY TERMS," which in turn claims claims priority under 35 U.S.C. §119 to U.S. Provisional Patent Application No. 60/835,121, filed on Aug. 1, 2006, entitled "Method and Apparatus for Generating Synonyms," both of which are incorporated herein in their entirety.

BACKGROUND

1. Field of the Invention

The present invention generally relates to the field of information retrieval, and more specifically to the problem of retrieving answers to search queries and to assisting users in revising search queries.

2. Related Art

The World Wide Web (web) contains a vast amount of freely available information. However, locating a relevant item of information on the web can be a challenging task. Note that this problem continues to increase as the amount of information available on the web continues to grow.

Search engines can often help users to locate and retrieve a document of interest on the web. However, users often fail to select effective query terms during the searching process. For example, a user may enter the query [web hosting+fort wayne] when the city of Fort Wayne is usually referred to as Ft. Wayne. Or, a user may enter [free loops for flash movie] when most relevant pages use the term "music," rather than "loops" and the term "animation" rather than "movie." Thus, documents that satisfy a user's informational needs may use different terms than the specific query terms chosen by the user to express a concept of interest. Note that this problem becomes more of an issue as the number of terms in a query increases. For queries longer than three or four words, there is a strong likelihood that at least one of the terms is not the best term to describe the user's informational need.

Hence, there is a need to modify and/or expand user queries to include synonyms for query terms, so that retrieved documents will better meet the user's informational needs.

Unfortunately, solving this problem has proven to be a difficult task. A simple approach is to use pre-constructed synonym information, for example from a thesaurus or a structured lexical database. However, thesaurus-based systems have various problems. For example, they are often expensive to construct, and are generally restricted to one language.

A more significant issue is that the applicability of a synonym to a given phrase often strongly depends on the context in which the phrase is used. For example, the term "music" is not usually a good synonym for the term "loops," but it is a good synonym in the context of the example above. However, the context in the example above is sufficiently uncommon that the term "music" is not listed as a synonym for the term "loop" in standard thesauruses. Note that many other examples of contextually dependent non-traditional synonyms can be identified. Hence, even if conventional synonyms can be identified for a term, it may be difficult to identify specific synonyms to use in the context of a specific query.

Other conventional approaches cluster "related words." Such approaches suffer from the drawback that related words are not necessarily synonyms. For example, the words "sail" and "wind" would likely be clustered (because they co-occur in numerous documents); however they are not synonymous. Hence, substituting one for the other is likely to lead to undesirable search results.

Accordingly, what is needed is a method and an apparatus that identifies potential synonyms, and also identifies contexts in which they are applicable.

SUMMARY

One embodiment of the present invention provides a system that considers lexical synonyms for terms while processing a query. During operation, the system receives a query containing one or more terms. Next, the system identifies one or more lexical synonyms for the one or more terms. The system then generates an altered query using the one or more lexical synonyms and processes the altered query to produce search results.

In a variation on this embodiment, identifying the one or more lexical synonyms involves identifying a candidate synonym that differs from a term in punctuation or spacing.

In a further variation, identifying the candidate synonym that differs from the term in punctuation or spacing involves: removing all punctuation and spacing from the candidate synonym and the term; and comparing the candidate synonym and the term after the punctuation and spacing are removed.

In a variation on this embodiment, identifying the one or more lexical synonyms involves identifying an acronym.

In a variation on this embodiment, identifying the acronym involves: using an edit-distance technique to align a term and a phrase, and determining if a substantial number of the characters in the term align with first letters of terms in the phrase; and/or using an edit-distance technique to determine if the edit distance between the term and a string comprised of first letters of terms in the phrase, divided by the maximum of either the number of characters in the term or the number of words in the phrase, falls below a edit-distance threshold.

In a variation on this embodiment, identifying the one or more lexical synonyms involves using a pseudostemming technique, which determines that a term and a candidate synonym are pseudostems if: the term and the candidate synonym differ by a single character edit; or the length of the common prefix between the term and the candidate synonym divided by the maximum length of the term and the candidate synonym exceeds a common-prefix threshold, and the edit distance between the leftover components of the term and the candidate synonym (which are leftover after the common prefix) divided by the maximum length of the term and the candidate synonym falls below an edit-distance threshold.

In a variation on this embodiment, identifying the one or more lexical synonyms involves stripping diacritical marks from terms and candidate synonyms before comparing the terms and candidate synonyms with each other.

In a variation on this embodiment, identifying the one or more lexical synonyms involves using language-specific linguistic rules to facilitate gender and/or number stemming detection.

In a variation on this embodiment, identifying the one or more lexical synonyms involves identifying abbreviations.

In a further variation, identifying an abbreviation involves stripping vowels from a term and a candidate synonym and determining an edit distance between the stripped term and the stripped candidate synonym.

In a variation on this embodiment, identifying the one or more lexical synonyms additionally involves using a standard stemming technique to identify lexical synonyms.

In a further variation, the standard stemming technique can include a Lovins stemmer or a Porter stemmer.

In a variation on this embodiment, generating the altered query involves substituting a lexical synonym for a term.

In a variation on this embodiment, generating the altered query involves adding a lexical synonym to the query.

In a variation on this embodiment, identifying the one or more synonyms also involves identifying non-lexical synonyms for the one or more terms. In this variation, generating the altered query involves using any identified non-lexical synonyms and any identified lexical synonyms to generate the altered query.

In a further variation, while determining whether a candidate synonym is a synonym, the system calculates a function which factors in signals indicating that the candidate synonym is a lexical synonym and signals indicating that the candidate synonym is a non-lexical synonym.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling Ranking and Searching Processes

Figure 1:
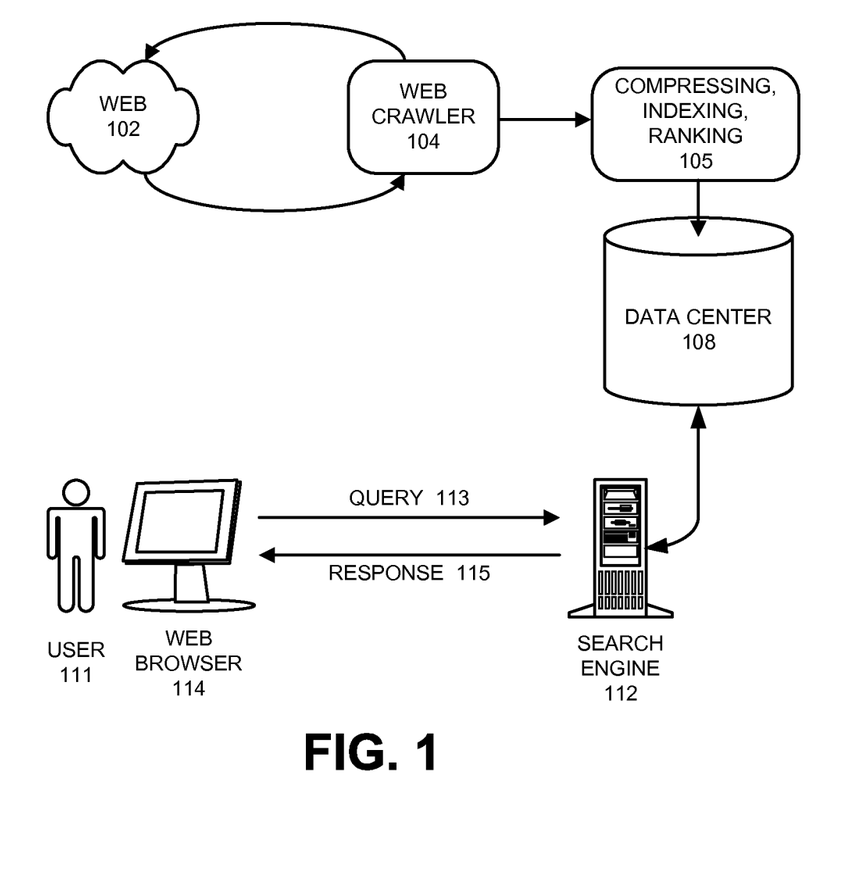
FIG. 1 illustrates the crawling, ranking and searching processes in accordance with an embodiment of the present invention.

FIG. 1 illustrates the crawling, ranking and searching processes in accordance with an embodiment of the present invention. During the crawling process, a web crawler 104 crawls or otherwise searches through websites on web 102 to select web pages to be stored in indexed form in data center 108. The selected web pages are then compressed, indexed and ranked in module 105 (using the ranking process described above) before being stored in data center 108.

During a subsequent search process, a search engine 112 receives a query 113 from a user 111 through a web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through web browser 114, wherein the response 115 contains matching pages along with ranking information and references to the identified documents.

Synonyms

Figure 2A:
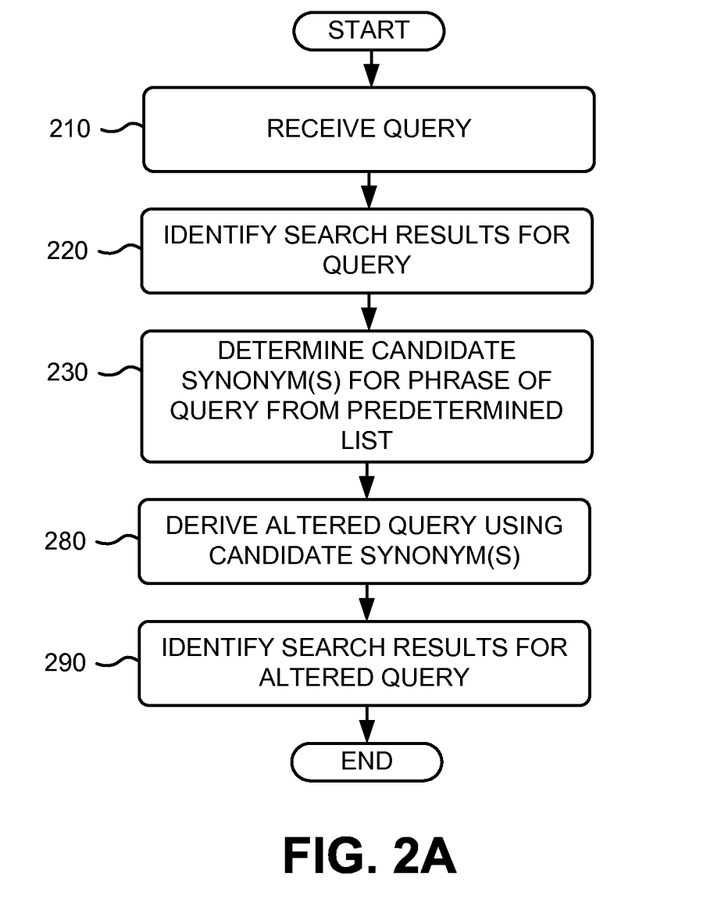
FIG. 2A presents a flowchart illustrating a method of providing altered queries according to one embodiment of the present invention.

FIG. 2A is a flowchart illustrating a method for altering queries to incorporate synonyms in accordance with an embodiment of the present invention. Initially, a search query is received from a client 110. In one embodiment, a front-end server is responsible for receiving the search query from the client (step 210). This front-end server provides the query to the search engine, which evaluates the query. In addition, the front-end server and/or search engine maintains various log files or lookup tables that storing each received query, as well as other information. More particularly, each query can be stored with a user identifier that identifies the particular browser and/or computer from which the query was received, a timestamp for the query, and a list of some number of the search results (e.g., a list of the top ten document IDs from the search). Other information related to user context or the search itself may also be stored.

Next, a list of search results for the search query is identified (step 220). In this example, the search engine evaluates the query to retrieve a set of search results in accordance with the search query and returns the results to the front-end server. The search engine communicates with one or more content servers to select documents that are relevant to the user's search query. (Note that a content server stores a large number of indexed documents, indexed (and/or retrieved) from different websites.) Alternately, or in addition, the content server can store an index of documents stored on various websites. "Documents" are understood here to be any form of indexable content, including textual documents, images, video, audio, multimedia, presentations, and so forth.

In one embodiment, each indexed document is assigned a page rank according to the document's link structure. This page rank serves as a query-independent measure of the document's importance. An exemplary form of page rank is described in U.S. Pat. No. 6,285,999, which is incorporated by reference herein. The search engine assigns a score to each document based on the document's page rank (and/or other query-independent measure of the document's importance), as well as one or more query-dependent signals of the document's importance (e.g., the location and frequency of search terms in the document).

Figure 2B:
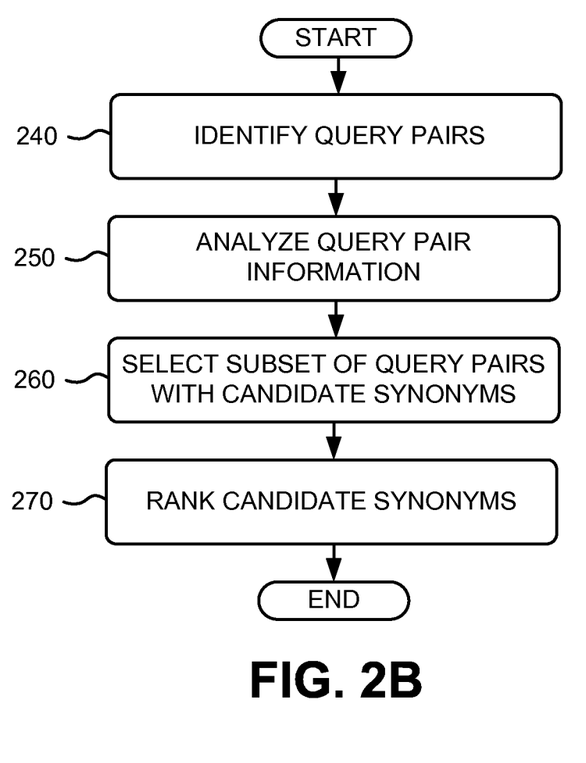
FIG. 2B presents a flowchart illustrating a process for determining one or more synonymous terms in a context of the user search query according to one embodiment of the present invention.

Then, one or more synonymous terms associated with a context of the search query are identified (step 230) from a predetermined list. Formation of the predetermined list may be accomplished using various processes. More specifically, FIG. 2B is a flowchart illustrating a process for determining one or more synonymous terms in the context of a search query according to one embodiment of the present invention.

First, query pairs are identified (step 240). An example of this process is further described in conjunction with FIG. 3. In one embodiment, this is accomplished by analyzing user query logs and lookup tables. The set of all queries received over some period are reviewed and all original and altered query pairs are identified. An altered query is defined as a query obtained by replacing a phrase in the original user query with a candidate synonym. A "phrase," in the context of the present invention is one or more individual words or terms. For example, an original user query might be [free loops for flash movie], and the altered query might be [free music for flash movie]. In addition, certain queries may be eliminated as having insufficient context. For example, queries used in the analysis may be required to have at least three terms. To facilitate identification of query pairs, possible query fragments, or "pseudo-queries," are formed by removing phrases from the query and replacing each phrase with a token (e.g., ":") that acts as a variable. Then, queries that vary only by the phrase marked with the token are identified as query pairs.

Next, information about the query pairs is analyzed (step 250). For each query pair, additional information to suggest that the phrase in the original query and altered query are synonymous is identified. For example, the evidence may include the frequency with which both queries in the pair are entered by the same user within a short time interval, or the number of top results that the original query and altered query share.

To further ensure that candidates are effectively synonymous, one or more additional tests can be used. One such test is to determine whether for every query containing the phrase A, the corresponding query with the phrase B substituted for A has a moderately high probability of occurrence in the stored data. In one embodiment of the present invention, the required probability is 1%.

A second test is that, for every query containing A, the corresponding query with B substituted for A has a minimum probability of being entered by the same user in a short time interval. In one embodiment, the interval is an hour and the probability is 0.1% or greater.

A third test is that, for every query containing A, if the corresponding query with B substituted for A occurs, the two queries have a minimum probability of having a number of the top results in common. In one embodiment, the probability is 60-70% and the number of results in common is 1-3. These tests are described further in conjunction with FIG. 4.

These tests can also be performed for subsets of query pairs in which the phrases appear in a particular context of adjacent words. For example, in the query pair [killer whale free photos] and [killer whale download photos], the candidate synonym pair "free," "download" appears in the context of following "whale," which can be indicated as (whale :), in the context of preceding "photos," which can be indicated as (: photos), in the context of between "whale" and "photos," which can be indicated as (whale : photos) and in the general context, which can be indicated as the token alone (:).

For each phrase, such as "free" above, and for each candidate synonym, such as "download" above, the statistics used for the above tests can be gathered for each of the most common contexts in which the phrase occurs. In this example, the query would be reflected in statistics for all occurrences of "free," the general context (:); for only occurrences of "free" following "whale," the context (whale :); for only occurrences of "free" preceding "photos," the context (: photos); and for only occurrences of "free" between "whale" and "photos," the context (whale : photos). Since many queries containing the phrase "free" are processed, statistics will be obtained for many contexts in which "free" has occurred, quite possibly many thousands of different contexts.

For each phrase such as "free" above, and for each candidate synonym, such as "download" above, the above tests are performed for the overall context, to determine whether the substitution is generally a good one. For example, it may be determined that "download" is not generally (i.e., in the general context) a good synonym for "free," is a good synonym in the context (: photos), and is not a good synonym in the context (: press). The conclusion in this example is that the context (: photos) is an exception to the general rule that "download" is not a good synonym for "free."

From the query pairs, a subset is selected (step 260) including phrases with candidate synonyms that meet certain criteria. In one embodiment, the criteria are some or all of the tests discussed above in the general context. In another embodiment, a number of top candidate synonyms are selected for the subset of query pairs. A synonym can be considered more significant than other synonyms, for example, if it is used in an altered query more often within user sessions, or if its altered query yields more search results in common with the original query.

Next, candidate synonyms are ranked (step 270), or qualified, using the criteria discussed above. Initially, a set of threshold conditions should be satisfied using the data gathered above as is discussed in greater detail in conjunction with FIG. 4. In one embodiment, the conditions may specify that for at least 65% of the original-altered query pairs, there is at least one search result in common and that the frequency with which the altered query follows (e.g., occurs within five sequential queries) the original query within a user session is at least 1 in 2000. Then, the statistics from step 250 are evaluated using a float scale function to determine a score for each qualified synonym, as discussed in greater detail in conjunction with FIG. 3. This score is a measure of the confidence in a qualified synonym. Depending on the application, greater or lesser confidence or strength will be required. Consequently, whether a qualified synonym is declared a useful synonym depends on the threshold value of evidence that is sufficient for the application.

Referring again to FIG. 2A, following identification in step 230 of synonymous terms, one or more altered queries are derived (step 280). Various methods exist for deriving alternative queries from the synonymous terms. One such method is disclosed in U.S. patent application Ser. No. 10/629,479, filed on Jul. 28, 2003, entitled "System and Method for Providing a User Interface with Search Query Broadening," which is incorporated herein by reference. In one embodiment, alternate queries are suggested that include the synonym, either as a substitution in or an addition to the query. In another embodiment, for example, when a user enters a given query, a number of alternative queries can be provided back to the user, along with the search results for the original query according to various methods. One such method is disclosed in U.S. Application Ser. No. 11/094,814, filed on Mar. 29, 2005, issued as U.S. Pat. No. 7,565,345 on Jul. 21, 2009, entitled "Integration of Multiple Query Revision Models," which is incorporated herein by reference.

In another embodiment, the synonym is treated as equivalent to the original phrase automatically for purposes of document retrieval. For example, the original query can be modified by replacing the phrase with a synonym or a disjunction of the original phrase and a synonym when producing search results for the query.

From the above steps, a list of altered search results for the altered query is identified (step 290). In one embodiment, this list may include a maximum number of results.

Figure 3:
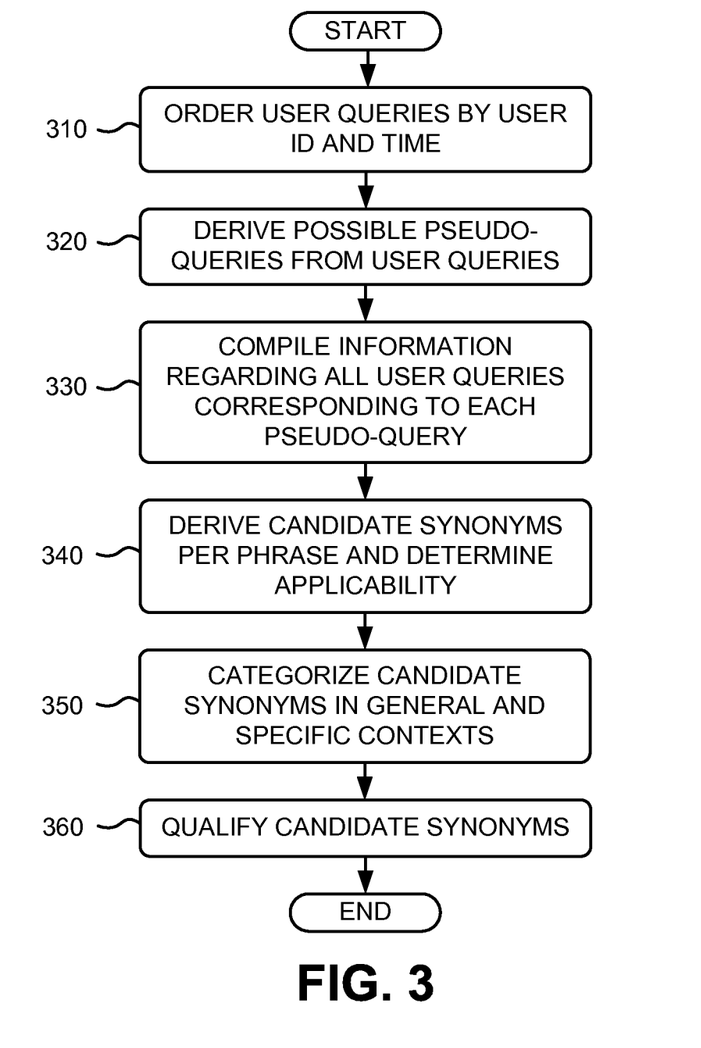
FIG. 3 illustrates an exemplary method for determining candidate synonyms for search query terms according to one embodiment of the present invention.

FIG. 3 depicts an example method of determining candidate synonyms for search query terms according to one embodiment of the invention. The method operates in the context of an information retrieval system, which generally includes a front-end server, a search engine, and an associated content server. During operation, users access the system via a conventional client over a network operating on any type of client computing device, for example, by executing a browser application or other application adapted to communicate over Internet-related protocols (e.g., TCP/IP and HTTP). The information retrieval system can operate on high performance server class computers, and the client device can be any type of computing device. The details of the hardware aspects of server and client computers are well known to those of skill in the art and thus are not further described here.

The front-end server starts by receiving a search query submitted by the client. Next, the front-end server provides the query to the search engine, which evaluates the query to retrieve a set of corresponding search results, and returns the search results to the front-end server. Next, the search engine communicates with one or more of the content servers to select documents that are relevant to the user's search query. Note that a content server stores a large number of documents, which are indexed (and/or retrieved) from different websites. Alternately, or in addition, the content server can store an index of documents stored on various websites.

The term "document" as used in this specification and appended claims refers to be any form of indexable content, including textual documents in any text or graphics format, images, video, audio, multimedia, presentations, web pages (which can include embedded hyperlinks and other metadata, and/or programs, e.g., in Javascript), etc. In one embodiment of the present invention, each indexed document is assigned a page rank according to the document's link structure. The page rank serves as a query-independent measure of the document's importance. An exemplary form of page rank is described in U.S. Pat. No. 6,285,999, which is incorporated herein by reference. The search engine assigns a score to each document based on the document's page rank (and/or other query-independent measure of the document's importance), as well as one or more query-dependent signals indicating the document's importance (e.g., the location and frequency of search terms in the document).

The front-end server and/or search engine maintains various log files that store each received user query, in association with other information. More particularly, each query is stored with a user identifier that identifies the particular browser and/or computer from which the query was received, a timestamp, and, for some queries, a list of some number of the search results (e.g., a list of the top ten document IDs from the search). Other information, contextual of the user, the search, or the like may also be stored. The information in the log files is then analyzed according to the methods described herein.

First, all queries received over a period of time, such as a week, are sorted (step 310) by user ID (e.g., by cookie), and then by time. This organizes the queries into individual user sessions, where a session is defined as queries from an individual client device (or user) occurring with a given time interval, for example one hour (though longer or shorter definitions of a session may be used, as desired). Assume that within a one hour window from one user, the following queries were logged from a individual client device:

[gm cars]
[gm new car prices]
[gm used car prices]
[general motors used car prices]

First, certain queries are eliminated as having insufficient context; preferably queries used in the analysis have at least three terms. Thus, in the forgoing example, the query [gm cars] is eliminated.

For each remaining query, all possible query fragments or pseudo-queries, are formed (step 320) by replacing a sequence of one or more terms with a marker or token (e.g., ":"), while leaving at least two words in the pseudo-queries. For the query [gm used car prices], the pseudo-queries are:

[: used car prices]
[gm : car prices]
[gm used : prices]
[gm used car :]
[: car prices]
[gm : prices]
[gm used :]

The generation of pseudo-queries may be described as iteratively replacing each term (or sequence of consecutive terms) of a query with a universal token. The term (or sequence of terms) that is replaced is called a "phrase."

Records are created for each pseudo-query of each query in session (step 330), which will be used to collect contextual information for the pseudo-queries, derive statistical information about term substitution, usage, and search result commonality. Each pseudo-query record is keyed by its pseudo-query, the original query from which it was derived, and the phrase that was replaced by the token to produce the pseudo-query. The keying of the pseudo-query records in this manner allows for multiple different sorts and aggregations of the pseudo-query records as further described below. Step 330 also optionally annotates a pseudo-query record with the first ten resultant document IDs (indicated below as "url#") returned by the search engine in response to the query, either extracted from the log files (if available), or indirectly with a pointer or other reference to an external store of the results. According to one embodiment, fewer or no document IDs may be annotated, to reduce the required storage space.

If two or more user queries in a session have pseudo-queries in common, more than one record will be created that is keyed with the same pseudo-query, but the records will differ in their original user queries. In addition, if the related user queries occurred within five queries of each other, a sub-record is added to each record indicating that there was a related query in the same session. In addition, the sub-record notes the phrase that the related query had in place of the corresponding phrase in this query, and whether the related query occurred before or after the other query of the data record.

For the above example user session, one data record produced for [gm used car prices] would be
{pseudo-query: [gm : car prices],
　original_query: [gm used car prices],
　phrase: used,
　related_phrases: <{phrase: new, before: yes, after: no}>
　top_results: <url370293847, url123985709, . . . >
}
　Another data record would be
{pseudo-query: [: used car prices],
　{original_query: [gm used car prices],
　phrase: gm,
　related_phrases: <{phrase: general motors,
　　before: no, after:yes}
　top_results: <url370293847, url123985709, . . . >
}

Note that in these examples pseudo-query records, the field delimiters (e.g., "pseudo-query:") are explicitly shown for illustrative purposes only, and in practice, would not be present in the actual records themselves. In addition, in these examples "related phrases" are phrases that may be classified as candidate synonyms.

One of the data records produced for the query [gm new car prices] would have the same pseudo-query as the first record above:
{pseudo-query: [gm : car prices],
   original_query: [gm new car prices],
   phrase: new,
   related_phrases: <{phrase: used, before: no, after: yes}>
   top_results: <url123985709, url093475987, . . . >
}

Similarly, one of the data records produced for the query [general motors used car prices] would have the same pseudo-query as the second record above:
{pseudo-query: [: used car prices],
   original_query: [general motors new car prices],
   phrase: general motors,
   related_phrases: <{phrase: gm, before: yes, after: no}>
   top_results: <url370293847, url123985709, . . . >
}

The process of generating the pseudo-queries operates to make explicit the range of potential contexts of each phrase that is implicit within each query. The records corresponding to an individual pseudo-query reflect what is known (i.e., across all user queries in the logs) about one set of queries that differ in only one phrase.

The records for each pseudo-query are then analyzed (step 340) to generate a new set of records that reflect how well each phrase appears to function as a synonym for some other phrase, if it occurs in the given pseudo-query. Pseudo-query records are sorted by pseudo-query such that all records with the same pseudo-query are grouped together. For example, assume that the records for the pseudo-query [: used car prices] include the two from above, plus two more, all of which are shown below:
{pseudo-query: [: used car prices],
   original_query: [gm used car prices],
   phrase: gm,
   related_phrases: <{phrase: general motors,
     before: no, after: yes}>
   top_results: <url370293847, url123985709, . . . >
}
{pseudo-query: [: used car prices],
   original_query: [general motors new car prices],
   phrase: general motors,
   related_phrases: <{phrase: gm, before: yes, after: no}>
   top_results: <url370293847, url123985709, . . . >
}
{pseudo-query: [: used car prices],
   original_query: [ford used car prices],
   phrase: ford,
   related_phrases: < >
   top_results: <url283923887, url739572390, . . . >
}
{pseudo-query: [: used car prices],
   original_query: [gm used car prices],
   phrase: gm,
   related_phrases: < >
   top_results: <url370293847, url123985709, . . . >
}

Thus, there is another query, [ford used car prices], as well as another instance of the query [gm used car prices] from elsewhere in the logs. Step 340 generates a single record for each phrase that is identified in a pseudo-query. In other words, all records with the same pseudo-query are grouped together and a new record is created for each phrase covered by the group, reflecting how that phrase relates to the other phrases of the group for that pseudo-query. Continuing the present example, step 340 creates a record for each of the phrases "gm," "general motors" and "ford." Each record includes candidate synonyms for the respective phrase.

Each record output by step 340 identifies the ten most significant potential synonyms for each phrase. The significance of synonyms is determined at this stage independent of context according to a hierarchy of tests. First, a synonym that occurs in more related queries within sessions is considered more significant than one that appears in fewer related queries. Second, if two synonyms occur in the same number of related queries within sessions (as is likely to be the case, since relatively few sessions have related queries), a synonym is considered more significant than another if the results returned for a search query that includes the first synonym have more results in common with the results returned for a query with the phrase. Finally, if two synonyms still evaluate as equally significant, one is considered more significant if it occurs more often within the queries corresponding to the respective pseudo-query.

As this example shows, even though a query may appear in several data records, as does [gm used car prices], the query is not weighted more heavily because it appears in more records. This aspect of the calculation is based on empirical evidence that it is more meaningful to examine many distinct queries than to simply count multiple occurrences of a given query.

Continuing with the present example, for the phrase "gm," and the pseudo-query [: used car prices], step 340 would output:
{phrase: gm,
   original_query: [gm used car prices],
   related_phrases: <{phrase: general motors, common_urls: 5,
     before: no, after: yes},
   {phrase: ford, common_urls: 0, before:no, after: no}>
}

As illustrated, step 340 passes on the session information from step 330. For example, the data record above reflects the session queries "gm used car prices," "general motors used car prices," and "ford used car prices." In many cases, like "ford" in this example, there the original and altered queries may occur in different sessions, yet not occur together in a single session. Step 340 also compares the search results (using, e.g., the document IDs) for each original and altered query if they were recorded, and tracks how many were in common. Thus, in the present example, [gm used car prices] and [general motors used car prices] had 5 documents in common among their respective top ten, while the results for [gm used car prices] had no documents in common with those for [ford used car prices]. Then, the records produced by this step are sorted by phrase, gathering together all records produced by step 340 for each phrase.

For each phrase, step 350 computes statistics that reflect how well each candidate synonym functions as a synonym in general (i.e., in the general context, ":"), as well as in specific contexts. In the examples at this level of the analysis, candidate synonyms are selected from the observed "related phrases." Continuing the present example, assume that for the phrase "gm," step 350 receives the above record, plus two more:

{phrase: gm,
    original_query: [gm used car prices],
    related_phrases: <{phrase: general motors, common_urls: 5,
before:no, after: yes},
    {phrase: ford, common_urls: 0, before:no, after: no}>
}
{phrase: gm,
    original_query: [gm new car prices],
    related_phrases: <{phrase: general motors, common_urls: 4,
    before:no, after: no},
        {phrase: 2005, common_urls: 0, before:no, after: no},
        {phrase: best, common_urls: 1, before:no, after: no}>
}
{phrase: gm,
    original_query: [nutrition of gm food],
    related_phrases: <{phrase: genetically modfied, common_urls: 6,
        before: no, after: yes},
        {phrase: macdonalds, common_urls: 0, before: no, after: no}>
}

Step 350 determines how many queries contained a particular phrase and computes statistics for each candidate synonym of the phrase. In one embodiment, this includes determining the number of queries for which the corresponding query with the synonym:
(i) existed (i.e., appeared in the logs);
(ii) existed and there was result data for both the original and altered queries, so that common results were computed;
(iii) existed and had at least 3 results in common;
(iv) existed and had at least 1 result in common;
(v) appeared earlier within a session; and
(vi) appeared later within a session.

In this example, for the phrase "gm," and the candidate synonym "general motors," the statistical data is:
(i) existed (i.e., appeared in the logs): 2;
(ii) existed and there was result data for both the original and altered queries, so that common results were computed: 2;
(iii) existed and had at least 3 results in common: 2;
(iv) existed and had at least 1 result in common: 2;
(v) appeared earlier within a session: 0; and
(vi) appeared later within a session: 1.

This data is strongly suggestive that "general motors" is a good synonym for "gm," although, in practice, statistics should be gathered over at least 1000 queries including the phrase "gm" in order to have confidence in the statistics.

In addition to evaluating these statistics for each synonym in the general context, step 350 also gathers statistics for each context in which the phrase occurs frequently. For example, statistics are gathered for the 10,000 contexts for which the most queries exist. In this example, the contexts would be (:), (: used), (: used car), (: new), (: new car), (of :), (nutrition of :), (: food), and (of : food). Only one of the queries discussed in the above example (original queries [gm used car prices], gm new car prices], and nutrition of gm food]) belongs to each of these specialized contexts, except the general context, (:), which subsumes all three queries. Realistically, however, some contexts will include data from many queries. Step 350 evaluates the above statistics for each context, retaining, for each context, only the 20 most common candidate synonyms.

Figure 4:
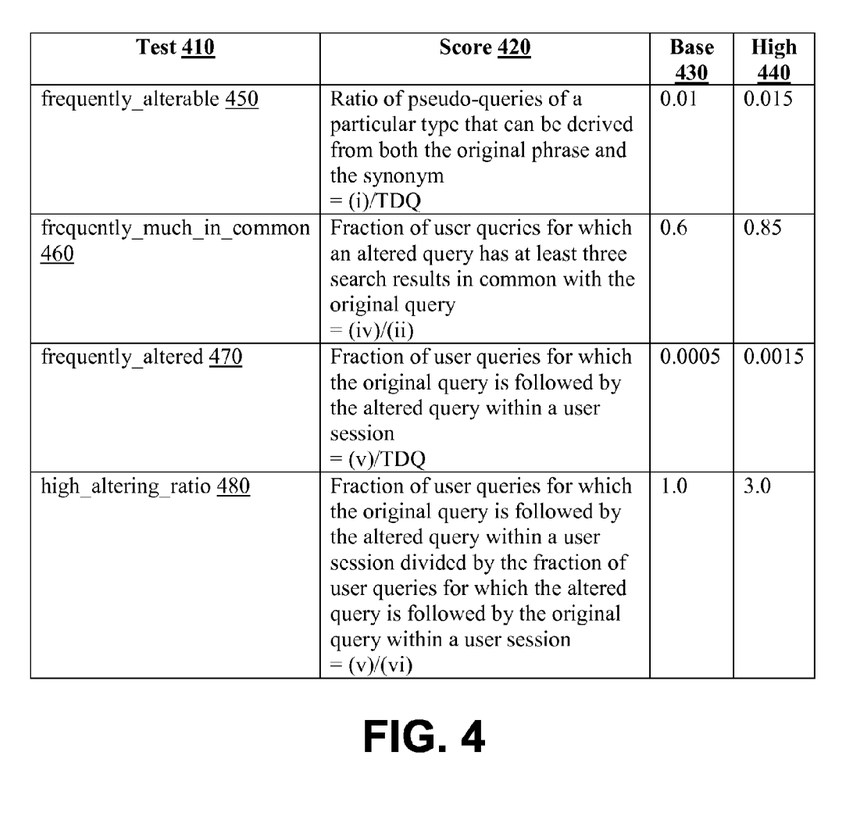
FIG. 4 presents a table illustrating several tests that may be used to qualify the quality or strength of a candidate synonym according to one embodiment of the present invention.

Step 360 further qualifies candidate synonyms using various tests. FIG. 4 is a table illustrating several tests that may be used to qualify the quality or strength of a candidate synonym according to one embodiment of the present invention. The tests 410 apply to statistics gathered in step 350.

The qualification begins by confirming that two preliminary conditions are satisfied. The first preliminary condition is that for at least 65% of the original-altered query pairs, there is at least one search result (e.g., a URL) in common. The 65% parameter is empirically derived, and other thresholds can be used as well, depending on the corpus of documents. The second preliminary condition is that for at least 1 in 2000 of the query pairs, a user in a session enters the original query followed by the altered query within, e.g., five queries.

If both preliminary conditions are satisfied, step 360 evaluates a number of the statistics from step 350 as a group, according weight to each statistic. The evaluation can be based on the following function:
    float Scale(float score, float base, float high) {
    float x=(score-base)/(high-base);
    float y=(x-sqrt(x*x+4.0))/2.0;
    return 1.0+y;
    }
where score 420 (ratio the test determines), base 430 (target value), and high (scaling factor) taken from the tests 410 of FIG. 4, which are described in greater detail below.

A series of tests 410 shown in FIG. 4 that apply function Scale to the data evaluated in step 350. Scale is defined such that the value returned should be 0 when score=base, should asymptotically approach 1 when score 420 is large positive, and should be about equal to (score-base)/(high-base) when score 420 is large negative. The value of base 430 reflects a desired value for the given test. The individual tests are defined as follows.

frequently_alterable 450 provides a measure of whether, for each query with the phrase of interest, the corresponding altered query occurs often enough (preferable more than 1%) to suggest that the candidate synonym makes sense in context. This computation is (i) from step 350 (queries in log) over the total number of distinct queries including the phrase (TDQ).

frequently_much_in_common 460 evaluates whether the original queries and altered queries typically exhibit enough results in common to suggest that the meanings of the phrase and candidate synonym are similar. Preferably, at least 60% of altered queries have at least 3 search results in common with the original user query. This computation is (iv) from step 350 (had at least one result in common) over ii) of step 350 (result data existed for both original and altered queries).

frequently_altered 470 evaluates whether users occasionally try the substitution. Preferably, for every 2000 user queries, there is a corresponding altered query within the same session. This computation is (v) from 350 (appeared earlier within a session) over TDQ.

high_altering_ratio 480 measures whether users do not preferentially substitute in the opposite direction, i.e., substitute the phrase for the candidate synonym, which would suggest that the original phrase is much better than the candidate synonym. Preferably, for every user session in which the altered query is followed by the user query, there is at least one session in which the user query is followed by the altered query within a user session. This computation is (v) from step 350 (appeared earlier within a session) over (vi) from step 350 (appeared later within a session).

The following parameters are next computed based on the above tests:
soft_and =frequently_alterable+2*frequently_much_in_common
+0.5*frequently_altered+high_altering_ratio
evidence=1.0−exp(−soft_and/1.5),
where exp is the natural exponential function, and soft_and reflects the totality of the test metrics.

The value of this variable evidence is a measure of the strength of or confidence in a synonym, qualified as discussed above. A value approaching 1.0 indicates very high confidence, while a value of 0.6 reflects good confidence. Depending on the application, greater or lesser confidence or strength can be required. Consequently, whether a candidate synonym is declared a validated synonym depends on the threshold value of evidence that is sufficient for the application. It has been empirically determined that for many applications, for example, a candidate synonym can be validated, e.g., considered equivalent to a phrase, if the value of evidence is greater than 0.6. Again, other thresholds and variations of the Scale function, and its subordinate functions may also be used.

A set of validated synonyms and the corresponding contexts in which they are effective can be utilized in several ways. A conservative approach is to suggest to the user alternative queries into which the synonym has been substituted. For example, when a user enters a given query, a number of alternative queries can be provided back to the user, along with the search results for the original_query. Each of the alternative queries can be linked to its associated search results, so that the user does not have to manually re-enter the alternative query.

A more aggressive approach automatically treats the synonym as equivalent to the original phrase for purposes of document retrieval. This approach replaces a phrase with a disjunction of the latter and the synonyms. For example, "gm" would be replaced by "gm" OR "general motors." Alternatively, if the evidence for a synonym is relatively weak, the synonym can be used as suggestive rather than equivalent;

Advantages of the present invention include a computer implemented method to determine synonyms to serve as substitutions for phrases within an information search query. Candidate substitutions may be suggested to the user or automatically included in addition to or in place of the original query. Alternately, the candidate substitution may be used solely to modify the score associated with the retrieved documents. A formula may be used to assess the strength or quality of candidate synonyms, and the strength or quality may be compared to a threshold that is determined according to the application of interest.

Extensions

The preceding discussion described a generalized technique for discovering and generating context-sensitive synonyms. This technique is very useful, but it fails to take into account an important signal—lexical relationships between words. Consequently, the above-described technique misses many useful stems and other lexically similar words.

The following discussion remedies this problem by providing for special classes of highly-trusted synonyms which are lexically related to the original word. We treat these synonyms differently and try to be more inclusive of them in our data. These lexically related words can be categorized in various ways, but all share the trait of there being a lexical connection between the original word and the synonym:

(1) synonyms that share the same stem as the original word, according to a industry-standard lexical stemming technique (e.g. car→cars);

(2) synonyms that differ from the original word according to punctuation or spacing differences (e.g. "wood stock"→woodstock, albertsons→albertson's); (3) synonyms that are acronyms of the original word/phrase or vice versa. (e.g. VFW→veterans of foreign wars);

(3) synonyms that are similar according to a prefix-biased edit-distance technique;

(4) synonyms that are similar except for accenting on certain characters; and (5) synonyms that are abbreviations of each other (hrs→hours).

The following section discusses specific implementations that detect lexical relationships between two words, as well as a scheme to include this signal in synonym generation (as described above) and scoring their confidences that can be applied generally to anything that we deem is lexically similar.

First we describe specific mechanisms for establishing lexical similarity, and then we describe a general technique that can use these detection mechanisms.

Detecting Lexical Similarity

Decompounding/Compounding

We have developed a technique for detecting synonyms that differ from the original word only by punctuation or spacing. This technique is fairly simple. One possible implementation is to run through the original word and the synonym and strip out all punctuation and spaces (both defined according to an accepted standard of character sets, e.g. UTF8). We then compare the results, and if they are equal, the synonym falls into this class. These types of synonyms tend to be prevalent in Germanic languages. An example in English is woodshed→"wood shed." Stripping out the spaces from both, we get "woodshed" and "woodshed" which are identical. An example of a punctuation difference is albertson's→albertsons. Stripping out punctuation, "albertson's" and "albertsons" are the same.

Acronym Synonyms

If one of the words is a single word, we run a standard edit-distance procedure to align the original word and the phrase. If a substantial number or fraction of the characters in the single word align with the first letters of the synonym phrase (or vice versa), we detect this as an acronym. In addition, we also collect the first characters of all the words in the phrase and run the edit-distance procedure again against the single word. If they are sufficiently similar (e.g. we allow only max_length*0.25 edits), we deem it an acronym. An alternate but simpler implementation might be to simply check that all characters in the word align with the first character of each word in the phrase. For example, in the first implementation, consider the acronym NASA→"National Aeronautic and Space Administration." We would extract from the phrase "NAASA" and try to align that with "NASA." There would be one edit (the edition of an "A"). The maximum length of both strings is 5, so 1/5=0.20 is below our 0.25 edit-distance threshold. The edit-distance threshold is not fixed, but could be set based on empirical measurements.

Pseudostems

One problem with standard stemming techniques is that they typically aim to be conservative because in the past they have been used to identify stems without the help of any additional signals. Our intent in identifying lexical variants is to use this as just one signal in a system that already produces high quality synonyms and stems.

Therefore, we developed a "pseudostemming" technique that is fairly aggressive compared to conventional stemmers. It works as follows. First, if the original word and the candidate synonym differ by 1 edit, we conclude it's a pseudostem. Otherwise, we use a sequence of tests: First we compute the length of the common prefix the two words share. In one embodiment of the present invention, we require that the number of characters of matching prefix divided by the maximum length of either string be greater than some threshold. For example, for "shuttler" and "shuttling," the common prefix is "shuttl," of length 5. The max length is 9, so the ratio is 5/9, which is 0.56. An empirically determined threshold can be 0.5, so this first test passes.

After the first test, we examine the leftover parts of both words after the common prefix. In the above example, that would be "er" from "shuttler" and the string "ing" from "shuttling." We calculate the edit distance between the leftovers. In this case, that'd be an edit distance of 3 (using a character mismatch cost of 1).

We can also require that this edit distance of the leftover components be less than some fraction of the max length of both strings. For example, the maximum length in the present example is 9, and our current fraction threshold is 0.4, so this is 0.4*9=4.4. An edit distance of 3 is <4.4, so in this case, the leftover edits would also pass this test. Since these two tokens pass both second tests, we declare them to be pseudostems.

Diacriticals

Finally, in many non-English languages the use of diacritical marks and accents are extremely common. We can strip these marks off with both language-specific and universal de-accenting. If the words are equal after stripping, they classify as lexical variants. In addition to doing this to the original words, we also do this stripping and input the stripped versions of the words to all of the above techniques. This allows us to catch the case where, for example, a character may be accented in the phrase for an acronym, but is not accented in the acronym itself. Similarly, this means that comparing an accented to unaccented character does not count as an edit in the pseudo-stemming or other techniques.

Gender/Number Stemming Detection

Using linguistic rules that are specific to each language, it is possible to develop a classifier that says that one word is a "conservative" stemming variant of another.

ABBREVIATIONS

Many people use abbreviations or short-hands for words. For example, "hours" can be written as "hrs" or "people" at "ppl." We detect abbreviations by stripping all vowels from both words, running a standard minimum edit-distance technique, and making sure that the number of edits between the stripped words is small compared to the maximum length of both words. For example, stripping vowels from "hours" we get "hrs." We compute the edit distance between "hrs" and "hrs," which is 0. The maximum length is 3 characters, so the ratio is 0/3, or 0.0. This ratio is less than an acceptable edit-distance threshold, which is empirically determined. (For point of reference, it is currently 0.25)

The above hodgepodge of techniques should not be considered exhaustive. We can use the above techniques and also standard stemming techniques to identify trusted lexical synonyms. In particular, we can use the Lovins and Porter stemmers, but other stemmers are known to those trained in the art and could be suitable replacements.

Using Lexical Similarity Detection in a Synonym Generation System

Note that we previously discussed how we used various signals to verify that a word is indeed a synonym. We can extend this technique to cover lexical synonyms. In one embodiment of the present invention, determining whether a word is a synonym involves considering: (1) a common result requirement, which specifies how frequently common query results should be produced when the word is substituted with the synonym in a query; and (2) a session switching requirement, which specifies how often a user switched the word with the synonym in a given session.

Note that the common result frequency and the session switching frequency provide a rough estimate of how closely the original word and the synonym are semantically related. Because the above detectors for lexical synonyms give us a stronger belief that the words are semantically related, we can lower our requirements for common results and for session switching for these classes of synonyms. Note that we can determine how far to lower these requirements empirically.

We found empirically that acronyms, compounds, and decompounds tend to have quite different results and sometimes have low session switching, so one embodiment of the present invention requires no common results for such lexical variants. Also, for compounds and decompounds and punctuation variants we can use 1/3 of the requirement for session switching as compared to general synonyms. This is because compounds and simple punctuation variants almost always mean the same thing, so we trust whatever evidence we have.

For pseudostems, stems, general/number stems, and abbreviations we can trade-off a high session switching rate and a high frequency of occurrence of queries with the substitution anywhere in the logs for a decreased common results requirement. In one embodiment, this includes a high threshold on session switching and the appearance anywhere in the logs (outside of sessions) of the synonym, which then triggers a lower threshold on common results. One could also create a different embodiment that trades the signals with an appropriate mixing function, which is approximated by the threshold in the embodiment above.

The above specify schemes that are specific to each lexical type in one embodiment of this invention, but one skilled in the art could recognize alternate schemes, such as categorizing the types into trust levels, symbolized by a number. This number could be used to modulate an aggressivity function for mixing signals that could be equivalent to the above embodiment.

Using Lexical Similarity to Highlight Synonyms in Search Result Snippets

The above techniques provide a way for recognizing lexically similar synonyms when generating synonym data. In addition to this process, we also use these methods as a filter to decide to highlight/bold the synonym in search result snippets, similar to how we highlight original query terms.

ALTERNATIVES

There are a number of alternatives to the above-described techniques. One might use different stemmer techniques to decide that tokens share the same stem. One might also use slightly different edit-distance techniques or a slightly different pseudostem filter (instead of using max length of strings, use average length, for example). One might use the lexical signals to modulate synonym generation differently. Instead of using a different threshold for trusted lexical synonyms, we might rate the level of trust and divide some base threshold by trust.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
receiving a query comprising a first term;
identifying, by one or more computers, one or more synonyms for the first term, wherein identifying the one or more synonyms comprises:

determining that the first term and a second term satisfy predetermined criteria associated with a particular class of related terms, in response to determining that the first term and the second term satisfy the predetermined criteria, selecting a threshold that is different from a default threshold, wherein the default threshold is a threshold that is used to evaluate terms that do not satisfy the predetermined criteria associated with the particular class of related terms, generating a score for the first term and the second term by evaluating a relationship between the first term and the second term, and determining that the second term is a synonym of the first term based on applying the generated score to the selected threshold;

generating an altered query using the second term; and processing the altered query to produce search results.

2. The method of claim 1, wherein the particular class of related terms comprises at least one of terms having a common stem, terms differing according to punctuation or spacing, acronyms, terms within a pre-defined edit-distance, terms differing according to the accents on certain characters, and abbreviations.

3. The method of claim 1, wherein the predetermined criteria is an edit distance, and wherein determining that the first and second terms satisfy the predetermined criteria comprises calculating an edit-distance between the first and second terms and determining that the edit distance is less than a predetermined threshold distance.

4. The method of claim 1, wherein determining that the first and second terms satisfy the predetermined criteria comprises identifying a prefix common to both terms and comparing the length of the prefix to the length of the terms.

5. The method of claim 1, wherein the generated score is based on the frequency of common search results between queries having the first term and queries having the second term in place of the first term.

6. The method of claim 1, wherein the generated score is based on an extent to which users switched between the first and second terms when entering search queries.

7. A system comprising:

one or more computers and one or more storage devices storing instructions that are operable, when executed by the one or more computers, to cause the one or more computers to perform operations comprising:

receiving a query comprising a first term;

identifying one or more synonyms for the first term, wherein identifying the one or more synonyms comprises:

determining that the first term and a second term satisfy predetermined criteria associated with a particular class of related terms, in response to determining that the first term and the second term satisfy the predetermined criteria, selecting a threshold that is different from a default threshold, wherein the default threshold is a threshold that is used to evaluate terms that do not satisfy the predetermined criteria associated with the particular class of related terms, generating a score for the first term and the second term by evaluating a relationship between the first term and the second term, and determining that the second term is a synonym of the first term based on applying the generated score to the selected threshold;

generating an altered query using the second term; and processing the altered query to produce search results.

8. The system of claim 7, wherein the particular class of related terms comprises at least one of terms having a common stem, terms differing according to punctuation or spacing, acronyms, terms within a pre-defined edit-distance, terms differing according to the accents on certain characters, and abbreviations.

9. The system of claim 7, wherein the predetermined criteria is an edit distance, and wherein determining that the first and second terms satisfy the predetermined criteria comprises calculating an edit-distance between the first and second terms and determining that the edit distance is less than a predetermined threshold distance.

10. The system of claim 7, wherein determining that the first and second terms satisfy the predetermined criteria comprises identifying a prefix common to both terms and comparing the length of the prefix to the length of the terms.

11. The system of claim 7, wherein the generated score is based on the frequency of common search results between queries having the first term and queries having the second term in place of the first term.

12. The system of claim 7, wherein the generated score is based on an extent to which users switched between the first and second terms when entering search queries.

13. A non-transitory computer-readable medium storing software comprising instructions executable by one or more computers which, upon such execution, cause the one or more computers to perform operations comprising:

receiving a query comprising a first term;

identifying one or more synonyms for the first term, wherein identifying the one or more synonyms comprises:

determining that the first term and a second term satisfy predetermined criteria associated with a particular class of related terms, in response to determining that the first term and the second term satisfy the predetermined criteria, selecting a threshold that is different from a default threshold, wherein the default threshold is a threshold that is used to evaluate terms that do not satisfy the predetermined criteria associated with the particular class of related terms, generating a score for the first term and the second term by evaluating a relationship between the first term and the second term, and determining that the second term is a synonym of the first term based on applying the generated score to the selected threshold;

generating an altered query using the second term; and processing the altered query to produce search results.

14. The medium of claim 13, wherein the particular class of related terms comprises at least one of terms having a common stem, terms differing according to punctuation or spacing, acronyms, terms within a pre-defined edit-distance, terms differing according to the accents on certain characters, and abbreviations.

15. The medium of claim 13, wherein the predetermined criteria is an edit distance, and wherein determining that the first and second terms satisfy the predetermined criteria comprises calculating an edit-distance between the first and second terms and determining that the edit distance is less than a predetermined threshold distance.

16. The medium of claim 13, wherein determining that the first and second terms satisfy the predetermined criteria comprises identifying a prefix common to both terms and comparing the length of the prefix to the length of the terms.

17. The medium of claim 13, wherein the generated score is based on the frequency of common search results between queries having the first term and queries having the second term in place of the first term.

18. The medium of claim 13, wherein the generated score is based on an extent to which users switched between the first and second terms when entering search queries.

* * * * *